Patented Apr. 3, 1956

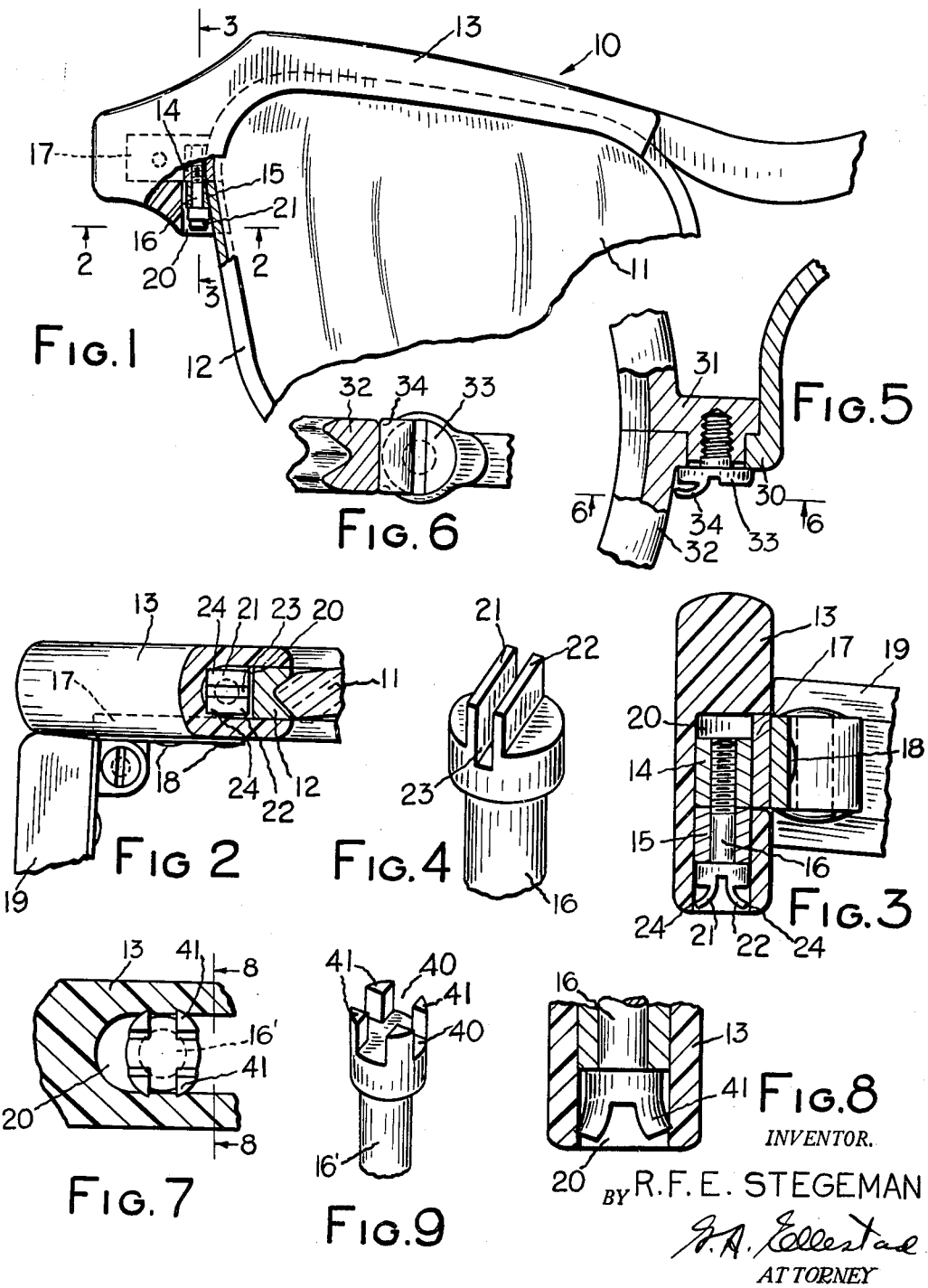

2,740,327

MEANS FOR DETACHABLY SECURING PARTS OF OPHTHALMIC MOUNTINGS

Raymond F. E. Stegeman, Greece, N. Y., assignor to Bausch & Lomb Optical Company, Rochester, N. Y., a corporation of New York Application October 11, 1952, Serial No. 314,274

4 Claims. (Cl. 88—47)

This invention relates to ophthalmic mountings and more particularly it has reference to means for detachably connecting parts of ophthalmic mountings.

Screws are used extensively in ophthalmic mountings for detachably holding together various parts such as the adjacent split ends of lens holding rims and the like. Through use of the ophthalmic mountings, the screws soon become loose so that the lenses are not firmly held in position. This difficulty seems to be especially prevalent in ophthalmic mountings of the type in which metallic lens rims are secured to non-metallic rim members which carry non-metallic temples.

One of the objects of this invention is to overcome the aforementioned difficulties and provide an improved means for locking the screws in ophthalmic mountings. A further object is to provide screw locking means which can be used in existing types of mountings and can be assembled therein without the use of special tools. Still another object is to provide locking means for screws which are located in recesses formed in ophthalmic mountings. These and other objects and advantages reside in certain novel features of construction, arrangement and combination of parts as will hereinafter be more fully explained and pointed out in the appended claims.

Referring to the drawings:

Fig. 1 is a fragmentary view of an ophthalmic mounting embodying my invention, with parts shown in section.

Fig. 2 is a sectional view taken on line 2—2 of Fig. 1.

Fig. 3 is a sectional view taken on line 3—3 of Fig. 1.

Fig. 4 is an enlarged fragmentary view of the screw used in my invention.

Fig. 5 is a view of a modification with parts in section.

Fig. 6 is a sectional view taken on line 6—6 of Fig. 5.

Fig. 7 is a view of a further modification.

Fig. 8 is a sectional view taken on line 8—8 of Fig. 7.

Fig. 9 is an enlarged fragmentary view of a modified screw.

A preferred embodiment of my invention is shown in the drawings wherein 10 indicates a fragmentary portion of an ophthalmic mounting having a lens 11 surrounded by the split metallic lens rim 12 which is attached to the non-metallic rim member 13. Secured to the respective ends of the rim 12 are the apertured lugs 14 and 15 which are held together by screw 16 which is threaded into lug 14. The upper lug 14 is connected to the hinge plate 17 which is secured to the non-metallic rim member by means of rivets 18. The usual temple 19 is hingedly carried by hinge plate 17. As shown in the drawings, the lugs 14 and 15 are positioned snugly within a recess 20 which is formed in the non-metallic rim member 13.

In order to lock the screw 16 against accidental rotation, there are provided a pair of spaced fins 21 and 22 which are integrally formed with the head of the screw and extend from the head in a direction which is substantially parallel to the axis of the screw. As shown in Fig. 6, the fins 21 and 22 are formed adjacent to the slot 23 in the screw head so that the adjacent walls of the slot are substantially co-planar to the walls of the screw slot 23. The fins are formed of flexible material and they are of such length that they may be bent laterally so as to bring the outermost ends of the fins into locking engagement with the inner walls of the slot 20, as shown at 24. In this instance, since the slot is in the middle of the screw, the fins 21 and 22 would project above the screw head for a distance that is greater than the radius of the screw head. The fins 22 have a width which is substantially equal to the diameter of the head of screw 16.

When the screw 16 is inserted in the lugs, the fins are substantially parallel as shown in Fig. 4 so that the screw driver may cooperate with the screw slot 23 in the usual manner. When the screw has been tightened, the slot 23 in the head should be so positioned that it is either parallel to the walls of the recess 20 as shown in Fig. 3 or perpendicular thereto. If the slot 23 is not thusly position, the screw 16 may be either tightened or loosened slightly, never more than one-eighth of a turn, in order to properly position the slot. In the former case, the two fins may be bent into locking engagement with the front and rear walls of the recess 20 as shown at 24, and in the latter case the fins may be bent laterally so that one is in locking engagement with the side wall of the recess 20 while the other fin will engage the lens rim 12. When the screw 16 is locked, the fins 21 and 22 are positioned substantially parallel to the walls of the recess, as shown in Figs. 2 and 3.

The fins 21 and 22 may be bent readily by means of a screw driver blade so special tools are not necessary for locking the screw against rotation. While the engagement of the fins with the adjacent parts is sufficient to lock the screw against accidental rotation, it is possible with a screw driver to exert enough force to overcome the locking engagement and so back the screw out for removal.

In the modification shown in Figs. 5 and 6, the two parts 30 and 31 on the adjacent ends of lens rim 32 are detachably united by means of a screw 33. A fin 34 which is flexible and integrally formed with the head of screw 33 is bent over laterally so as to engage the adjacent portion of lens rim 32 in order to lock the screw against accidental rotation.

In Figs. 7–9 there is shown a modified form of the screw as used in the ophthalmic mounting illustrated in Figs. 1–3. In this form, the head of screw 16' has two slots 40 formed substantially at right angles to each other so as to provide four fins 41 which are located, respectively, in the four quadrants of the screw head as shown in Fig. 9. The screw 16' may be turned into place by a screw driver which coacts with either of the slots 40. When the screw has been properly positioned, the fins 41 may be bent laterally with the screw driver blade so as to bring them into locking engagement with the walls of recess 20 formed in the non-metallic member 13.

From the foregoing it will be apparent that I am able to attain the objects of my invention and provide improved means for holding together the parts of an ophthalmic mounting. The modified screw which is used in my invention can be readily made on screw machines so that the cost thereof is low. These screws can be used effectively on ophthalmic mountings which have at least one wall or part adjacent the screw for locking engagement therewith. The invention is especially useful and effective in ophthalmic mountings of the type shown in Figs. 1–3 wherein the lens rim lugs are snugly positioned within a recess in the non-metallic rim member. Various modifications may obviously be made without departing from the spirit of my invention as pointed out in the appended claims.

I claim:

1. In an ophthalmic mounting having a lens surrounded by a split rim held together by a slotted head screw passing through apertured lugs one of which is threaded to cooperate with the screw and both of which are secured to the respective ends of the split rim and are snugly positioned within a recess formed in a non-metallic member attached to the rim, the combination of means for locking the screw against rotation comprising a pair of spaced fins integrally formed with the head of the screw and extending away therefrom in a direction substantially parallel to the axis of the screw, the adjacent faces of the fins being substantially co-planar with the side walls of the slot in the head of the screw, said fins extending away from the head of screw for a distance that is greater than the radius of the screw head, said fins being flexible whereby they may be bent and spread apart laterally to bring the fins into locking engagement with the inner walls of the recess in the non-metallic member.

2. In an ophthalmic mounting the combination of a split metallic rim surrounding a lens, a non-metallic rim member secured to the metallic rim, apertured lugs carried by the respective ends of the split rim, one of said lugs being threaded, said non-metallic rim member having a recess within which the lugs are positioned, a screw having a slotted head, said screw passing through one of the lugs and threaded into the threaded lug for holding them together, a pair of spaced fins integrally formed on the head of the screw, said fins extending beyond the head of the screw in planes which are substantially parallel to the axis of the screw, said fins being flexible and of such dimensions along the axis of the screw that they may be spread apart laterally to bring the ends of the fins into locking engagement with the adjacent inner walls of the recess whereby the screw will be locked against rotation.

3. In an ophthalmic mounting the combination of a split rim surrounding a lens, apertured lugs secured to the respective ends of the rims, one of said lugs being threaded, a screw passing through one of the lugs and threaded into the threaded lug for releasably holding them together, a substantially vertical wall adjacent the head of the screw, said wall being substantially perpendicular to a vertical plane lying between the screw head and the adjacent lens rim, said screw having a slot in its head, and a pair of spaced fins integrally formed on the screw head and extending above the head in a direction substantially parallel to the axis of the screw, the adjacent faces of the fins being substantially co-planar with the walls of the slot, said fins being flexible and having vertical dimensions such that they may be spread apart and bent outwardly and downwardly and into selective engagement with the adjacent lens rim or the wall in order to lock the screw against accidental turning.

4. In an ophthalmic mounting the combination of a split rim surrounding a lens, apertured lugs secured to the respective ends of the the split rim, one of said lugs being threaded, a screw passing through one of the apertured lugs and threaded into the threaded lug for holding them together, a substantially vertical wall positioned adjacent the head of the screw and intersecting the vertical plane of the lens rim, said screw having a slot in its head, and a pair of spaced fins formed integrally with the head of the screw and extending away therefrom in a direction substantially parallel to the axis of the screw, the adjacent faces of said fins being co-planar with the side walls of the slot, said fins extending away from the head of the screw a distance which is greater than the radius of the screw head, the width of the fins being substantially equal to the diameter of the screw head, said fins being flexible whereby they may be bent away from each other and beyond the circumference of the screw head to selectively engage the adjacent wall or lens rim so as to lock the screw against accidental turning.

References Cited in the file of this patent

UNITED STATES PATENTS

| 840,143 | Leonard | Jan. 1, 1907 |
| 856,897 | McKee et al. | June 11, 1907 |
| 1,627,912 | Lomason | May 10, 1927 |
| 2,036,550 | Stevens | Apr. 7, 1936 |
| 2,050,961 | Olson | Aug. 11, 1936 |